(12) United States Patent
Cross et al.

(10) Patent No.: US 9,670,372 B2
(45) Date of Patent: Jun. 6, 2017

(54) INKJET INK COMPOSITION

(71) Applicant: Domino Printing Sciences PLC, Cambridge (GB)

(72) Inventors: Julie Cross, Watford (GB); Cindy Cham, Cambridge (GB); Florie Claudine Plais, Longstanton (GB)

(73) Assignee: Domino Printing Sciences PLC (GB)

( * ) Notice: Subject to any disclaimer, the term of this patent is extended or adjusted under 35 U.S.C. 154(b) by 0 days.

(21) Appl. No.: 14/440,172

(22) PCT Filed: Oct. 21, 2013

(86) PCT No.: PCT/GB2013/052743
§ 371 (c)(1),
(2) Date: May 1, 2015

(87) PCT Pub. No.: WO2014/068280
PCT Pub. Date: May 8, 2014

(65) Prior Publication Data
US 2015/0291816 A1    Oct. 15, 2015

(30) Foreign Application Priority Data

Nov. 2, 2012 (GB) .................................. 1219748.9
Oct. 17, 2013 (GB) .................................. 1318393.4

(51) Int. Cl.
*C09D 11/03* (2014.01)
*C09D 11/107* (2014.01)
*C09D 11/36* (2014.01)

(52) U.S. Cl.
CPC ............ *C09D 11/03* (2013.01); *C09D 11/107* (2013.01); *C09D 11/36* (2013.01)

(58) Field of Classification Search
CPC ......... C09D 11/00; C09D 11/36; C09D 11/03; C09D 11/107
See application file for complete search history.

(56) References Cited

U.S. PATENT DOCUMENTS

| 4,207,577 A * | 6/1980 | Mansukhani .......... C09D 11/36 347/100 |
| 4,279,653 A * | 7/1981 | Makishima et al. ....... 106/31.32 |
| 5,939,468 A * | 8/1999 | Siddiqui ....................... 523/161 |
| 6,030,439 A * | 2/2000 | Erdtmann ............ C09D 11/322 106/31.6 |
| 6,538,049 B1 * | 3/2003 | Kappele ............... C09D 11/322 523/160 |
| 8,142,559 B2 | 3/2012 | Robertson et al. |
| 8,182,597 B2 | 5/2012 | Robertson et al. |
| 9,284,463 B2 | 3/2016 | Brown et al. |
| 2002/0029723 A1 * | 3/2002 | Fox ...................... C09D 11/322 106/31.86 |
| 2003/0045607 A1 * | 3/2003 | Ichikawa ............... C09D 11/18 523/160 |
| 2004/0151457 A1 * | 8/2004 | Naruse et al. ................ 385/128 |
| 2005/0207824 A1 * | 9/2005 | Ichikawa ............... C09D 11/18 401/209 |
| 2006/0075915 A1 * | 4/2006 | Sonokawa et al. ........ 101/450.1 |
| 2009/0130400 A1 * | 5/2009 | Feiler et al. ............... 428/195.1 |
| 2011/0135893 A1 * | 6/2011 | Oyanagi et al. ............. 428/196 |
| 2011/0292114 A1 * | 12/2011 | Sao ...................... C09D 11/328 347/20 |

FOREIGN PATENT DOCUMENTS

| EP | 0501406 | 9/1992 |
| JP | 2844655 | 10/1998 |
| JP | H1112518 | 1/1999 |
| JP | 02060661 | 2/2002 |
| WO | 2010042105 | 4/2010 |
| WO | 2011041364 | 4/2011 |

OTHER PUBLICATIONS

English language translation of JP 11012518, pp. 1-14.*
Physical Properties of Alcohols, pp. 1-3, no publication date given, obtained online from http://2012books.lardbucket.org/books/introduction-to-chemistry-general-organic-and-biological/s17-03-physical-properties-of-alcohol.html.*

* cited by examiner

*Primary Examiner* — Alexander Kollias
(74) *Attorney, Agent, or Firm* — Prive Heneveld LLP

(57) ABSTRACT

An inkjet ink composition including one or more volatile organic solvents and one or more colorants, said ink being characterized in that it includes one or more humectants and a terpene phenolic resin.

17 Claims, 1 Drawing Sheet

| Ink | Tape Adhesion Result |
|---|---|
| Ink 1 | |
| Ink 2 | |
| Ink 3 | |
| Ink 4 | |

INKJET INK COMPOSITION

FIELD OF THE INVENTION

This invention relates to inkjet ink compositions and in particular, though not necessarily solely, to compositions for thermal inkjet (TIJ) printing.

BACKGROUND OF THE INVENTION

In the field of industrial coding and marking codes, dating, and traceability information are applied directly onto products and/or product packaging. To achieve high quality images on a consistent basis in industrial environments, it is advantageous for the inkjet ink to have a long decap time.

Decap time is defined as the period of time that a printhead can be left uncapped at idle and still produce a high quality code when printing is restarted. Some inkjet inks suffer from the ink drying out around the nozzles resulting in poor decap behaviour and therefore a loss of print quality. Poor decap behaviour is often caused by the solvent in the ink evaporating and leaving behind non-volatile materials which at least partially obstruct the nozzles and are therefore detrimental to jetting performance.

A common method of improving the decap performance of an inkjet ink is to add non-volatile humectants to the ink to reduce the likelihood of the ink drying in the nozzles. However this can have a detrimental effect on the drying time of the ink.

Thermal inkjet (TIJ) printing is a desirable coding and marking technology as it offers significantly higher print resolutions than competing technologies in the field, such as continuous inkjet. However, with the increasing trend to use flexible plastic materials for food packaging, there is a requirement for inks to dry quickly and adhere well to these semi-porous and non-porous substrates. The majority of commercially available thermal inkjet inks are water based and, as a result, suffer from relatively long drying times and poor adhesion on semi-porous or non-porous substrates. Thus there is a need for TIJ inks containing volatile organic solvents.

The art published to date reveals the use of various additives to improve the decap behaviour of inkjet inks, including TB inks, containing solvents, colorants, binders and humectants.

International (PCT) Patent Application WO2011/041364, discloses a thermal inkjet ink composition including a volatile organic solvent, a binder resin, a dye, up to 40% of a humectant to keep the drying time low, and an additive for extending the decap time. The additive is selected form plasticisers, surfactants, aliphatic hydrocarbons, drying oils and mixtures thereof, the resulting inks exhibiting a maximum decap time of 10 minutes.

International (PCT) Patent Application WO2010/042105 discloses the use of a decap controlling additive which has a vapour pressure from 1-5 mm Hg at 25° C., has a boiling point greater than the base solvent of the ink and is selected from the group consisting of 1-methoxy-2-propanol, ethyl lactate, tert-butanol, tert-butyl acetate, 1-butanol and combinations thereof. The inks exemplified in this application exhibit a maximum decap time of 5 minutes.

U.S. Pat. No. 8,182,597 discloses a solvent based inkjet ink composition comprising at least 50 weight % volatile organic solvent, a colorant, a humectant, from 0.3 weight % to 8 weight % of a binder resin and not more than 5 weight % water, where the ink composition is suitable for use in a thermal ink jet printer and has a decap time of at least 60 seconds. Again the maximum decap time illustrated in this patent is 5 minutes.

U.S. Pat. No. 8,142,559 discloses a thermal ink jet ink comprising one or more volatile organic solvents selected from $C_1$-$C_4$ alcohols, $C_3$-$C_6$ ketones and mixtures thereof, one or more humectants wherein the humectants are present in an amount not more than 30 weight %, one or more binder resins and one or more dyes, where the ink composition is suitable for use in a thermal ink jet printer and has a decap time of at least 15 seconds. In the examples given in the patent, maximum useful decap time is limited to 60 seconds.

European Patent No 0 501 406 discloses an ink for an inkjet printer containing an oil soluble dye, a synthetic resin and an organic solvent where the synthetic resin contains a terpene-phenol copolymer resin and a styrene-acrylic copolymer resin. The terpene-phenol copolymer resin and styrene-acrylic copolymer resins are included to provide excellent jetting stability, excellent abrasion resistance, adhesion to various recording materials and, in particular, excellent spreading of the ink dots and adhesion to a recording material attached with a wax, and a recording material coated with a coating composition containing a wax. The ink described is suitable for use in a continuous inkjet printer, an environment in which de-cap performance is not generally an issue because ink is circulated continuously and, at the end of printing, the print head is generally flushed to ensure ink does not remain in the nozzle. Not surprisingly, there is no mention of humectants in EP 0 501 406 and this patent is also silent as to decap performance.

It is one object of the present invention to overcome or address the problems of prior art inkjet ink compositions or to at least provide a commercially useful alternative thereto. It is an alternative and/or additional object to provide an inkjet ink composition which is cheaper to make and/or more effective than known inkjet ink compositions.

Preferably the inkjet ink composition as described herein has improved decap properties (i.e. increased decap times) compared with known inkjet ink compositions. Alternatively, the inkjet ink composition as described herein may have equally as commercially useful decap times as known commercial inkjet ink compositions.

Preferably the thermal ink jet ink composition for a thermal inkjet printer will not only exhibit drying times in the order of less than 5 seconds on non-porous substrates, such as polypropylene, but is also capable of exhibiting decap times of at least 1 hour.

SUMMARY OF THE INVENTION

Accordingly, in one aspect, the invention provides an inkjet ink composition including one or more volatile organic solvents and one or more colorants, said ink being characterised in that it includes one or more humectants and a terpene phenolic resin.

In a further aspect of the present invention there is provided the use of a terpene phenolic resin as a decap time increasing additive in an inkjet ink composition, preferably in a thermal inkjet ink composition.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

Preferably said ink includes one or more binders.

Preferably said one or more binders are selected from polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins and mixtures of two or more thereof. In one embodiment the composition does not comprise a styrene-acrylic copolymer resin and/or a polyvinyl butyral resin. In one embodiment, the binder consists or comprises of an acrylic resin.

Preferably said one or more binders are present in an amount up to 30% by weight.

More preferably said one or more binders are present in an amount up to 10% by weight.

Preferably said one or more volatile organic solvents are present in an amount less than 50 by weight %. The one or more volatile organic solvents may be present in an amount less than 45% by weight, less than 40 by weight %, or less than 35 by weight % based on the total weight of the composition.

More preferably said one or more volatile organic solvents are present in an amount of 5% to 45% by weight, or from 10% to 40% by weight.

Preferably said one or more volatile organic solvents are selected from alcohols, ketones, esters and ethers and mixtures thereof. More preferably, the one or more volatile organic solvents are selected from alcohols, ketones, ethers and mixtures thereof.

More preferably still said one or more volatile organic solvents are selected from $C_1$-$C_4$ alcohols. More preferably the one or more volatile organic solvents are selected from $C_2$-$C_4$ alcohols. Preferably said volatile organic solvent comprises or consists of ethanol.

The one or more volatile organic solvents may comprise or consist of methyl ethyl ketone.

Preferably said one or more colourants are present in an amount of from 0.1% to 15% by weight. More preferably said one or more colourants are present in an amount of from 0.5% to 10% by weight based on the total weight of the composition.

Preferably said one or more colourants comprise any suitable dye and/or pigment.

Preferably said one or more humectants are present in an amount greater than 35 weight %. The one or more humectants may be present in an amount greater than about 40% by weight or greater than about 45% by weight, based on the total weight of the composition. The one or more humectants may be present in an amount of from greater than about 35% by weight to about 80% by weight, or from about 40 by weight % to about 70%, by weight or from about 50% by weight to about 65% by weight based on the total weight of the composition.

Preferably, said one or more humectants are selected from the group consisting of polyol, glycol ether, glycol ether acetates, diacetone alcohol, 2-pyrrolidinone, N-methylpyrrolidinone, ethyl lactate, butyllactate, propylene carbonate, 1,3-dimethyl-2-imidazolidindione, and alkyl esters, and any combination thereof.

Preferably said polyol is selected from the group consisting of polyethylene glycol, polypropylene glycol, poly(ethylene-co-propylene glycol), trimethylol propane, ethylene glycol, glycerin, diethylene glycol, triethylene glycol, tripropyleneglycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5 pentanediol, 2,2,4-trimethyl-1,3-pentanediol, neopentyl glycol, pentaerythritol, sorbitol, mannitol, and any combination thereof.

Preferably said glycol ether is selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycoln-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycolmonomethyl ether, polypropylene glycol monomethyl ether, methoxytriglycol, ethoxytriglycol, butoxytriglycol, 1-butoxyethoxy-2-propanol, and any combination thereof.

Preferably, the glycol ether is selected from the group consisting of ethylene glycolmonomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycolmonoethyl ether, polyalkyl ether and any combination thereof. More preferably, the glycol ether is selected from the group consisting of ethylene glycolmonomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycolmonoethyl ether, and any combination thereof.

A particularly preferred humectant is propylene glycol monomethyl ether.

Alternatively or additionally a preferred humectant is 1,1,2,2-Tetramethoxyethane.

In one embodiment the humectant is selected from the group comprising or consisting of one or more of polyalkyl ethers, glycol ethers, and any combination thereof. Preferably, the humectant comprises or consists of propylene glycol monomethyl ether and/or 1,1,2,2-Tetramethoxyethane.

Preferably said terpene phenolic resin comprises a copolymer of a pinene and a phenol such as phenol or bisphenol.

Preferably said terpene phenolic resin is selected to have a molecular weight in the range 500 to 1000.

Preferably said terpene phenolic resin comprises a copolymer of a pinene and a phenol such as that sold under the trade mark Dertophene T.

Preferably the terpene phenolic resin has a Tg value of less than about 55° C., more preferably, the terpene phenolic resin has a Tg value in the range of from about 40° C. to about 55° C., more preferably still from about 45° C. to about 50° C., and most preferably approximately about 48° C. Glass transition temperatures (Tg) are typically measured using differential scanning calorimetry. Preferably, additionally or alternatively, the terpene phenolic resin comprises less than about 46 weight % of substituted phenol based on the total weight of the terpene phenolic resin, more preferably the terpene phenolic resin comprises from about 40 to about 46 weight %, or from about 42 to 45 weight %, of substituted phenol based on the total weight of the terpene phenolic resin. Phenols are compounds with an —OH group attached to an aromatic carbon, but when one of the hydrogens on the aromatic ring is replaced with an alternative chemical species, in this case a terpene molecule, it becomes a substituted phenol. The weight % of substituted phenol present in a material can be quantified from analysis of the $^{13}$C NMR spectra.

Preferably said terpene phenolic resin is present in an amount of up to 30% by weight. More preferably said terpene phenolic resin is present in an amount up to 20% by weight and even more preferably up to 10% by weight. More preferably, the inkjet ink composition comprises less than about 5% by weight of terpene phenolic resin based on the total weight of the composition. More preferably still, the inkjet ink composition comprises less than about 3%, less than about 2% or less than or equal to about 1.5% by weight of terpene phenolic resin based on the total weight of the composition. The composition preferably comprises from 0.5% to 5% by weight of terpene phenolic resin based on the total weight of the composition. More preferably the composition comprises from 1% to 3% by weight of terpene phenolic resin based on the total weight of the composition. The inventors have surprisingly found that at such low levels, the decap time of the compositions may be increased, preferably without detrimentally affecting other properties of the composition. For example, unexpectedly, the inventors have found that when such levels of terpene phenolic resin are present, preferably less than about 5% or less than about 3%, more preferably less than or equal to about 1.5% by weight of terpene phenolic resin based on the total weight of the composition the viscosity of the composition is substantially unaffected. It is particularly important for thermal inkjet ink compositions that the viscosity of the composition is not too high. As outlined below, typically the thermal ink jet ink composition disclosed herein has a viscosity of less than about 10 mPa·s, preferably less than about 5 mPa·s, more preferably less than about 3 mPa·s, and most preferably less than about 2 mPa·s, for example, a viscosity from about 1 to 4 or from about 1 to about 3 mPa·s at 25° C. If the viscosity of thermal inkjet ink compositions is too high (i.e. above 10 mPa·s at 25° C.) it is difficult to achieve good jetting behaviour from a thermal inkjet ink. More preferably the viscosity is below 5 mPa·s at 25° C.

Preferably said ink further includes a surfactant.

Preferably said surfactants is selected from modified polysiloxanes, alkyl modified polyoxyalkyleneamines, alkyl modified propoxylated (poly(oxypropylene)) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol and polyoxyethylated fatty alcohols.

More preferably said surfactant comprises a polyether modified polydimethylsiloxane.

Preferably said surfactant is present in an amount up to 1% by weight.

More preferably said surfactant is present in an amount from 0.01% to 0.5% by weight.

Preferably said ink is compatible with the components of a thermal inkjet printer.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future.

Detailed Description of Method

This invention provides a thermal inkjet ink composition comprising one or more volatile organic solvents and one or more colorants. The characteristic of the ink is that it further includes one or more humectants, a terpene phenolic resin and, optionally, one or more binders. The resulting ink is suitable for being applied directly onto products and/or product packaging to achieve high quality images.

To achieve high quality codes, it is important that the ink can provide a long decap time so that high quality codes can be printed after periods of printer inactivity. In addition, thermal inkjet compositions for industrial marking and coding should exhibit short drying times on semi-porous or non-porous substrates, good adhesion on semi-porous or non-porous substrates and compatibility with the components of a thermal inkjet printer cartridge.

To improve adhesion onto non-porous substrates, it is known to add binders to the inkjet ink composition. However it is well known that the addition of binders can substantially reduce decap time. Terpene phenolic resins are known in the art to act as tackifiers to improve adhesion on to non-porous substrates. However intuitively one would also expect the addition of terpene phenolic resins to adversely affect decap time. It was therefore a surprise to the inventors to find that although a minor improvement in adhesion was achieved on addition of the terpene phenolic resin, a substantial improvement in decap time was observed.

The term "decap control," as referred to herein, means the ability of the inkjet ink to readily eject from the print head, upon prolonged exposure to air. The ink decap time is measured as the amount of time that an inkjet printhead may be left uncapped before the printer nozzles no longer fire properly, potentially because of clogging or plugging. Generally, nozzle(s) may become clogged (i.e. impeded, slowed) or plugged (i.e. obstructed, substantially or completely closed) by a viscous plug that forms in the nozzle(s) as a result of water/solvent loss, crusting of the ink, and/or crystallization of the dye in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is that there is a misdirection of ink through the nozzle's orifice to a lesser or greater degree, or a complete blockage, which can be precisely indicated in a printed image on media printed by the nozzle. The clogging and plugging effect on nozzles and their ink printing performance can be tested by various methods. In its simplest form, one method involves printing a given test pattern with the printhead nozzles to verify their working condition. This is followed by exposing the nozzles to the air for predetermined increasing periods of time without printing or spitting the nozzles. Then, all of the nozzles are printed again in the given test pattern for the second time. The test patterns are then compared to determine the number of weak or misdirected nozzles. The longest period of time that the printhead may be left uncapped, yet still produce a high quality code with minimal missing nozzles when printing resumes, is taken as the decap time of the ink composition.

In the worst case, such nozzle clogging or plugging results in a complete failure to fire by the nozzle.

To assess the quality of the test pattern, 2D datamatrix codes were used and were analyzed using an LVS Integra 9505 bar code verifier. A grade of A-C is taken as acceptable while a D, F or 'not valid' indicates a poor quality code.

Drying time is defined as the time taken for a printed code to dry on a chosen substrate. This is assessed by printing range of characters (usually an X) on the substrate at the chosen resolution and at one second intervals, successive characters being wiped with a gloved finger until the print ceases to smear.

Adhesion is assessed by preparing a 12 μm draw-down of the ink onto the substrate of choice which is then allowed to dry thoroughly overnight. The surface of the ink draw-down is then scored with a Sheen Cross Hatch Cutting Wheel and a piece of 3M SCOTCH® tape grade 810 is adhered firmly over the top of the cross hatched area. The tape is then removed and adhered to a piece of white card. Image analysis software is then used to assess how dark the section of tape is that was adhered to the ink draw-down giving an indication of how much ink was removed with the tape. A scale of 0-246 is used where 0 indicates the tape is black and all of the ink has been removed with the tape as a result of poor adhesion, and 246 indicates that no ink has been removed due to excellent adhesion of the ink on the substrate.

Compatibility of the ink with the components of the thermal inkjet printer cartridge may be assessed according to two methods. One method involves filling the printer cartridge with the ink and storing it at high (40° C.) and low (5° C.) temperatures for up to a year and, at predetermined time frames, carrying out printing tests to assess image quality. If there is any incompatibility between the ink and the cartridge components a loss of image quality is seen. The second method involves carrying out soak tests where critical components of the cartridge are soaked in the ink for 4 weeks at 40° C. after which any changes in mass or shape/size are assessed. Incompatibilities show up as changes in mass or shape/size.

In an effort to achieve a solvent based ink with the features discussed above an ink formulation is disclosed comprising one or more volatile organic solvents, one or more colorants, one or more humectants, a terpene phenolic resin and optionally other ingredients such as binders, surfactants and biocides. The term ink colorant refers to any species that may provide colour to the ink.

The inkjet ink composition disclosed herein is particularly intended for drop-on demand printing, such as a thermal inkjet printing or Piezo inkjet printing. More particularly, the inkjet ink composition as described herein is intended for thermal inkjet (TIJ) printing.

The one or more volatile organic solvents are selected from alcohols, ketones, esters and ethers and mixtures thereof and are preferably selected from $C_1$-$C_4$ alcohols, more preferably from $C_2$-$C_4$ alcohols, examples of which are ethanol, 1-propanol and 2-propanol. The organic solvent is included in the formulation to evaporate quickly to give short drying times and to penetrate the semi-porous or non-porous substrates to help improve the adhesion. The preferred organic solvent is ethanol and may be present at a level of up to 50% by weight, preferably 5 to 45% by weight or from 5 to 40% by weight.

In one embodiment, the one or more volatile organic solvents are selected from the group consisting of alcohols, ketones, ethers and mixtures thereof, more preferably they are selected from the group consisting of alcohols, ethers and mixtures thereof. More preferably still, the one or more volatile organic solvents are selected from the group consisting or comprising of one or more alcohols, for example, ethanol, 1-propanol, 2-propanol, n-butanol, sec-butanol, isobutanol, tert-butanol, and mixtures of two or more thereof. These solvents are particularly preferred for compatibility reasons with Thermal Inkjet cartridges. In one embodiment the one or more volatile organic solvents are not esters. In one embodiment the composition does not comprise esters.

Any suitable colourant may be used in the present invention. The colorant may comprise any suitable dye and/or pigment. The colorant refers to any species that may provide colour to the ink.

Any dye that is soluble in the organic solvent may be used and chosen from the dyes commonly used in ink compositions, especially inkjet ink formulations such as, but not necessarily restricted to, direct dyes, acid dyes, basic dyes, food grade dyes, basic dyes, reactive dyes, disperse dyes and mixtures thereof.

Inorganic and organic pigments may be used as the pigment without particular limitation. Inorganic pigments usable herein include, in addition to titanium oxide and iron oxide, carbon blacks produced by known processes, such as contact, furnace, and thermal processes. Organic pigments usable herein include (but are not confined to) azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigment), nitro pigments, nitroso pigments, and aniline black.

Preferably the colourant, which may be a pigment or a dye, is present in an amount of from 0.1% to 15% by weight based on the total weight of the composition. More preferably, the inkjet ink composition comprises from 0.5% to 10% by weight of colorant based on the total weight of the composition.

Humectants are additives which maintain a wet environment in the vicinity of the ink jet nozzle during the evaporation process, thus extending the decap time. However high levels of humectant can also adversely affect drying time.

Preferably, humectants have a boiling point greater than 150° C., greater than 200° C., or greater than 250° C., and/or a relative evaporation rate less than 1.0, less than 0.9, less than 0.7, less than 0.4, less than 0.1, or less than 0.01. The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. Preferably, the one or more humectants are selected from the group consisting of polyol, glycol ether, glycol ether acetates, diacetone alcohol, 2-pyrrolidinone, N-methylpyrrolidinone, ethyl lactate, butyllactate, propylene carbonate, 1,3-dimethyl-2-imidazolidindione, and alkyl esters, and any combination thereof.

For example, the polyol is selected from the group consisting of polyethylene glycol, polypropylene glycol, poly (ethylene-co-propylene glycol), trimethylol propane, ethylene glycol, glycerin, diethylene glycol, triethylene glycol, tripropyleneglycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5 pentanediol, 2,2,4-trimethyl-1,3-pentanediol, neopentyl glycol, pentaerythritol, sorbitol, mannitol, and any combination thereof.

A preferred humectant is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycoln-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycolmonomethyl ether, polypropylene glycol monomethyl ether, methoxytriglycol, ethoxytriglycol, butoxytriglycol, 1-butoxyethoxy-2-propanol, and any combination thereof, and preferably, the glycol ether is selected from the group consisting of ethylene glycolmonomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycolmonoethyl ether, optionally 1,1,2,2-Tetramethoxyethane, and any combination thereof. A preferred humectant is propylene glycol monomethyl ether or 1,1,2,2-Tetramethoxyethane, or a combination of both.

Humectants are known in the art to increase decap times of inkjet inks; however, excessive amounts of humectants are known to increase the drying time of the ink jet ink composition. For this reason humectants are typically used in an amount of 30 weight % or less. In the thermal inkjet ink composition of this invention it has been found, surprisingly, that the one or more humectants can be present in an amount greater than 35 weight % and preferably greater than 40 weight % whilst still achieving low drying times.

The terpene phenolic resin for use in this invention is preferably a copolymer of a terpene such as α-pinene, β-pinene etc and a phenol such as phenol, bisphenol etc. The molecular weight of the terpene phenolic resin is preferably from 500 to 1000. A suitable commercially available terpene phenolic resin is Dertophene T, available from Les Dérives Résiniques & Terpéniques, although the terpene phenolic resin for use in this invention is not limited to this example. The terpene phenolic resin may be present in an amount up to 30% by weight but preferably up to 20% by weight and more preferably up to 10% by weight.

Suitable binders include polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins and mixtures of two or more thereof. Preferably the one or more binders are selected from the group consisting of polyamide resins, polyurethane resins, rosin ester resins, acrylic resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins, polyketone resins and mixtures of two or more thereof. The inkjet ink composition may comprise up to 30% by weight of binders based on the total weight of the composition. More preferably, the inkjet ink composition comprises up to 10% by weight of binders based on the total weight of the composition.

Optionally the ink jet ink composition may contain other ingredients such as surfactants. Suitable surfactants include modified polysiloxanes, alkyl modified polyoxyalkyleneamines, alkyl modified propoxylated (poly(oxypropylene)) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol and polyoxyethylated fatty alcohols. A preferred surfactant is a polyether modified polydimethylsiloxane. The surfactant may be present in the inkjet ink composition in an amount up to 1 weight %, preferably in the range from 0.01 to 0.5 weight %.

Typically the thermal ink jet ink composition disclosed herein has a viscosity of less than about 10 mPa·s, preferably less than about 5 mPa·s, more preferably less than about 3 mPa·s, and most preferably less than about 2 mPa·s, for example, a viscosity from about 1 to 4 or from about 1 to about 3 mPa·s at 25° C. Viscosity can be measured using any laboratory viscometer such as a Brookfield Viscometer such as DV-II viscometer.

Typically the thermal ink jet ink composition has a surface tension from about 20 to about 50 mN/m preferably from about 21 to about 35 mN/m at 25° C. Surface tension may be measured using any suitable measurement equipment such as a KSV CAM 200 goniometer.

The thermal ink jet ink composition described herein provides a long decap time so that high quality codes can be printed after significant periods of printer inactivity. For example the ink has a decap time of at least 1 hour, preferably at least 2 hours, at least 4 hours, at least 8 hours and most preferably at least 16 hours at 25° C.

In addition, the ink has one of more of the following features: short unassisted drying time on semi-porous or non-porous substrates, good adhesion on semi-porous or non-porous substrates and compatibility with the components of a thermal inkjet printer cartridge. For example the thermal ink jet ink composition has an unassisted drying time on a non-porous substrate such as polypropylene of less than 10 seconds, 5 seconds or less or 2 seconds or less depending on the printing resolution. On porous substrates such as carton board, shorter unassisted drying times are achieved, for example less than 1 second.

In a preferred embodiment, the thermal ink jet ink composition has a decap time of at least 1 hour, and/or good adhesion and/or a drying time of less than 5 seconds on non-porous substrates (for example polypropylene) when used in a thermal ink jet print head.

Preferably the inkjet ink composition as described herein is a thermal inkjet ink composition.

In one aspect of the present invention there is provided the use of a terpene phenolic resin as a decap time increasing additive in an inkjet ink composition, preferably in a thermal inkjet ink composition. Preferably the decap time of a composition without terpene phenolic resin is less than the decap time of the same composition with the addition of terpene phenolic resin (the composition being identical in all other aspects).

Preferably, the terpene phenolic resin is added to the inkjet ink composition such that it is present in the inkjet ink composition in an amount of less than about 10 weight %, preferably less than about 5 weight %, or less than about 3 weight % or less than or equal to about 1 weight % based on the total weight of the inkjet ink composition.

In one embodiment of the present invention there is provided an ink cartridge comprising the ink composition as described herein.

In another embodiment of the present invention there is provided an ink jet printing method comprising the steps of providing an ink cartridge containing the ink composition as described herein, ejecting droplets of the ink composition and depositing the droplets onto a substrate to perform printing. Any suitable substrate may be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc. In one embodiment of the present invention there is provided a substrate or article comprising a print produced by the method described herein.

Unless stated to the contrary, all percentages (%) are percentages (%) by weight and preferably are percentages (%) by weight based on the total weight of the composition.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The following non-limiting examples further illustrate the present invention.

EXAMPLES

Example 1

A set of Thermal inkjet inks suitable for printing onto semi-porous and non-porous substrates were prepared using the formulations shown in Table 1.

TABLE 1

| Component | Ink 1 (Control) Comparative Example | Ink 2 Comparative Example | Ink 3 | Ink 4 |
|---|---|---|---|---|
| Ethanol/% | 34.0 | 33.5 | 32.5 | 32.0 |
| Propyleneglycol monomethyl ether/% | 49.5 | 49.5 | 49.5 | 49.5 |
| 1,1,2,2-Tetramethoxyethane/% | 11.4 | 11.4 | 11.4 | 11.4 |
| Surfactant/% | 0.1 | 0.1 | 0.1 | 0.1 |
| Acrylic binder/% | — | 0.5 | — | 0.5 |
| Dertophene T/% | — | — | 1.5 | 1.5 |
| Dye/% | 5.0 | 5.0 | 5.0 | 5.0 |

The percentages (%) are percentages (%) by weight based on the total weight of the composition.

The acrylic binder used was a methacrylate copolymer. The dye was solvent black 27. The surfactant was BYK-333, a Polyether-modified polydimethylsiloxane.

To assess the decap performance thermal inkjet cartridges were filled with each ink and 2D datamatrix codes were printed at 600×200 dpi. Each cartridge was then left with the nozzles exposed to the air for predetermined periods of time without printing or spitting the nozzles. After each time period, the same 2D datamatrix code was printed again. After each test point, the 2D datamatrix codes were graded using an LVS Integra 9505 bar code verifier. A grade of A-C is taken as acceptable while a D, F or 'not valid' indicates a poor quality code. Table 2 shows the results for each ink.

TABLE 2

| | 2D Datamatrix Grade After Decap Period | | | |
|---|---|---|---|---|
| Ink | 15 seconds | 3 minutes | 3 hours | 16 hours |
| 1 (control) Comparative Example | B | Not valid | Not valid | Not valid |
| 2 Comparative Example | D | Not valid | Not valid | Not valid |
| 3 | B | B | B | C |
| 4 | C | B | B | C |

The data in Table 2 show that addition of the acrylic binder to the ink composition (ink 2) results in a worse decap behavior compared to the control ink. However when the terpene phenolic resin (in this case Dertophene T) was added (ink 3), a substantial improvement in decap time was seen where good quality codes were still produced even after the nozzles had been idle and exposed to the air for 16 hours. The extended decap time was also seen when both the acrylic binder and the terpene phenolic resin were included in the ink composition (ink 4).

To test for the effect of the acrylic binder and terpene phenolic resin on adhesion, 12 μm draw-down of the inks were prepared on polypropylene substrates and allowed to dry thoroughly overnight. The tape adhesion test was then carried out, the results of which can be seen in FIG. 1 appended hereto. A visual assessment of the adhesion was made and in addition, the samples were assessed using image analysis software where a scale of 0-246 is used. 0 indicates the tape is black and all of the ink has been removed with the tape as a result of poor adhesion and 246 indicates that no ink has been removed due to excellent adhesion of the ink on the substrate.

TABLE 3

| Ink | Visual Assessment of Adhesion | Image Analysis Assessment of Adhesion |
|---|---|---|
| Ink 1 (control) Comparative Example | No adhesion - all ink removed | 0 |
| Ink 2 Comparative Example | No adhesion - all ink removed | 0 |
| Ink 3 | Some adhesion - approx 50% ink removed | 29 |
| Ink 4 | Good adhesion | 106 |

The data in Table 3 and images in FIG. 1 indicate that poor adhesion was achieved when either the acrylic binder or the terpene phenolic resin was used alone, but when combined a significant improvement in adhesion onto non porous substrates such as polypropylene was achieved.

The data in Table 4 show the drying time results for both inks when printed at two different resolutions onto a non-porous substrate such as polypropylene.

TABLE 4

| Ink | Drying Time at 300 × 200 dpi on Polypropylene | Drying Time at 600 × 200 dpi on Polypropylene |
|---|---|---|
| Ink 1 (control) Comparative Example | 1-2 seconds | 2-3 seconds |
| Ink 2 Comparative Example | 1-2 seconds | 2-3 seconds |
| Ink 3 | 1-2 seconds | 2-3 seconds |
| Ink 4 | 1-2 seconds | 2-3 seconds |

The data in Table 4 show that although the inkjet ink composition contains greater than 30% humectant (the maximum level typically used in inkjet inks to prevent an increase in drying time), short unassisted drying times are still achieved.

Example 2

A further example of a thermal inkjet ink suitable for printing onto semi-porous and non-porous substrates was prepared using the formulations shown in Table 5.

TABLE 5

| Component | Ink 5 |
|---|---|
| Ethanol/% | 43.9 |
| Propyleneglycol monomethyl ether/% | 37.1 |
| 1,1,2,2-Tetramethoxyethane/% | 11.4 |
| Surfactant/% | 0.6 |
| Acrylic binder/% | 0.5 |
| Dertophene T/% | 1.5 |
| Dye/% | 5 |

The acrylic binder was a methacrylate copolymer. The dye was solvent black 27. The surfactant used was a combination of BYK-333 and Tego Glide 440, a polyether siloxane copolymer.

Decap measurements for Ink 5 were carried out using the method described above for the Example 1. The results are provided below in Table 6.

TABLE 6

| | 2D Datamatrix Grade After Decap Period | | | |
|---|---|---|---|---|
| Ink | 15 seconds | 1 minutes | 2 hours | 16 hours |
| 5 | C | B | B | B |

While a specific embodiment has been described in detail above, it will be apparent to those skilled in the art that the disclosed embodiment may be modified using different ink formulations in alternative Thermal Inkjet printing heads.

The invention claimed is:

1. An inkjet ink composition including one or more volatile organic solvents and one or more colorants, said inkjet ink being characterized in that it includes one or more humectants and a terpene phenolic resin having a weight average molecular weight in the range from 500 to 1000 g/mol and a glass transition temperature from about 40° C. to about 55° C.; wherein
    the inkjet ink composition does not comprise a styrene-acrylic copolymer resin and/or a polyvinyl butyral resin;
    said one or more volatile organic solvents are present in an amount less than 35% by weight based on the total weight of the inkjet ink composition and are selected from the group consisting of alcohols, ketones, ethers, and mixtures thereof;
    said one or more humectants are selected from the group consisting of polyol, glycol ether, glycol ether acetates, diacetone alcohol, 2-pyrrolidinone, N-methylpyrrolidinone, ethyl lactate, butylacetate, propylene carbonate, 1,3-dimethyl-2-imidazolidindione, and alkyl esters, and combinations thereof; the one or more humectants are present in an amount greater than 35% by weight of the inkjet ink composition; and
    the inkjet ink composition has a decap time of at least one hour and a viscosity of less than about 10 mPas.

2. The inkjet ink composition as claimed in claim 1 further including one or more binders, wherein said one or more binders are selected from the group consisting of polyamide resins, polyurethane resins, rosin ester resins, acrylic resins, polyesters, phenolic resins, vinyl resins, cellulose ethers, cellulose nitrate resins, polymaleic anhydrides, acetal polymers, polystyrene/polybutadiene copolymers, sulfonated polyesters, aldehyde resins, polyhydroxystyrene resins, polyketone resins, and combinations thereof.

3. The inkjet ink composition as claimed in claim 2, wherein said one or more binders are present in an amount up to 10% weight of the inkjet ink composition.

4. The inkjet ink composition as claimed in claim 1, wherein said one or more humectants are a polyol, wherein said polyol is selected from the group consisting of polyethylene glycol, polypropylene glycol, poly(ethylene-co-propylene glycol), trimethylol propane, ethylene glycol, glycerin, diethylene glycol, triethylene glycol, tripropyleneglycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5 pentanediol, 2,2,4-trimethyl-1,3-pentanediol, neopentyl glycol, pentaerythritol, sorbitol, mannitol, and combinations thereof.

5. The inkjet ink composition as claimed in claim 1, wherein said terpene phenolic resin comprises a copolymer of a pinene and a phenol or a bisphenol.

6. The inkjet ink composition as claimed in claim 1, wherein said terpene phenolic resin is present in an amount of up to 10% by weight of the inkjet ink composition.

7. The inkjet ink composition as claimed in claim 1 further including a surfactant, wherein said surfactant is selected from the group consisting of modified polysiloxanes, alkyl modified polyoxyalkyleneamines, alkyl modified propoxylated poly(oxypropylene) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol and polyoxyethylated fatty alcohols.

8. The inkjet ink composition as claimed in claim 7, wherein said surfactant comprises a polyether modified polydimethylsiloxane.

9. The inkjet ink composition as claimed in claim 1, wherein said terpene phenolic resin comprises less than 46% by weight of substituted phenol based on the total weight of the terpene phenolic resin.

10. The inkjet ink composition as claimed in claim 1, wherein said alcohols are selected from the group consisting of $C_1$-$C_4$ alcohols.

11. The inkjet ink composition as claims in claim 1, wherein said one or more humectants comprises a glycol ether, where said glycol ether is selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, and combinations thereof.

12. The inkjet ink composition as claimed in claim 1, wherein said one or more humectants comprises a glycol ether, wherein the glycol ether is selected from the group consisting of ethylene glycol monomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycol monoethyl ether, 1,1,2,2-tetramethoxyethane, and combinations thereof.

13. The inkjet ink composition as claimed in claim 1, wherein said one or more humectants comprises propylene glycol monomethyl ether and/or 1,1,2,2-tetramethoxyethane.

14. The inkjet ink composition as claimed in claim 1, wherein said terpene phenolic resin is present in an amount of up to 5% by weight of the inkjet ink composition.

15. The inkjet ink composition as claimed in claim 7, wherein said surfactant is present in an amount from 0.01% to 0.5% by weight of the inkjet ink composition.

16. The inkjet ink composition as claimed in claim 1, wherein the inkjet ink composition is a thermal inkjet ink composition.

17. An inkjet ink composition comprising:
a binder;
a volatile organic solvent;
a colorant;
a surfactant;
a humectant consisting of propylene glycol monomethyl ether and/or 1,1,2,2-tetramethoxyethane; and
a terpene phenolic resin having a weight average molecular weight in the range from 500 to 1000 grams/mol and a glass transition temperature from about 40° C. to about 55° C.;
wherein the inkjet ink composition does not comprise a styrene-acrylic copolymer resin and/or a polyvinyl butyral resin;
wherein the volatile organic solvents are present in an amount less than 35% by weight of the inkjet ink composition and the humectant is present in an amount greater than 35% by weight of the inkjet ink composition; and
wherein the inkjet ink composition has a drying time of less than 5 seconds, a decap time of at least sixteen hours, and a viscosity of less than about 10 mPas.

* * * * *